United States Patent [19]
Reed et al.

[11] 3,983,365
[45] Sept. 28, 1976

[54] TAPE READERS

[75] Inventors: Gordon Howard Reed; Michael Anthony Yates, both of Jersey, Guernsey (Channel Is.)

[73] Assignee: Television Research Limited, Jersey, Guernsey (Channel Is.)

[22] Filed: June 6, 1975

[21] Appl. No.: 584,483

[30] Foreign Application Priority Data
June 8, 1974 United Kingdom............... 25525/74

[52] U.S. Cl. ...................... 235/61.11 A; 178/17 B; 200/46
[51] Int. Cl.² ................... G06K 7/06; H04L 15/20; H01H 43/08
[58] Field of Search ............. 235/61.11 R, 61.11 A, 235/61.11 C, 61.11 E; 200/46; 178/17 B

[56] References Cited
UNITED STATES PATENTS

| | | | |
|---|---|---|---|
| 2,395,557 | 2/1946 | Leathers | 235/61.11 A |
| 2,743,868 | 5/1956 | Wockenfuss | 235/61.11 C |
| 3,280,308 | 10/1966 | Pack et al. | 235/61.11 C |
| 3,448,247 | 6/1969 | Jones, Jr. | 235/61.11 A |

*Primary Examiner*—Daryl W. Cook
*Attorney, Agent, or Firm*—Laurence R. Brown

[57] ABSTRACT

A perforated tape reading mechanism provides a programmable timing function. A drum rotatable by a synchronous motor carries the tape, and is supplied with a ratchet mechanism which permits the drum to rotate by said motor over a partial rotation and then returns the drum for another such cycle through a selectively variable number of ratcheted steps. A tape reader mechanism senses the perforations.

10 Claims, 3 Drawing Figures

TAPE READERS

The present invention relates to tape readers for reading perforated tapes.

According to the present invention, there is provided a tape reader for reading perforated tapes comprising rotatable drive means peripherally engageable in use with an apertured tape to drive the tape along an arcuate path, first means located on one side of the path, second means mounted on a rotatable support on the other side of the path to co-operate with the first means to detect the presence between it and the first means of an aperture in the tape, means for engaging the support with the drive means so that they rotate together, means for disengaging the support from the drive means after a predetermined rotation of the support from a starting position, and means for returning the support to the starting position after its disengagement from the drive means.

The first and second means may comprise contacts arranged to connect through an aperture in the tape, or a radiation source and a radiation detector arranged to detect radiation passing through an aperture in the tape.

The invention also provides a programmable tape timer comprising a tape reader as hereinbefore defined, a synchronous motor for driving the drive means, and a support arranged to receive a tape cartridge so that the perforated tape of the cartridge may be passed along the said path between the first and second contacts.

Preferably the drive means comprise a sprocket the teeth of which are arranged to engage in apertures in a tape to be driven. The support and drive engaging means may comprise a leaf spring fixed for example to the support and engageable in a ratchet in the sprocket or in a member connected to the sprocket.

The first contact may comprise a member having an arcuate surface which is conductive, the member being pivotable to a position away from the second contact to allow access to the first contact.

An embodiment of the present invention will now be described, by way of example, with reference to the accompanying drawings, in which.

Figure 1:
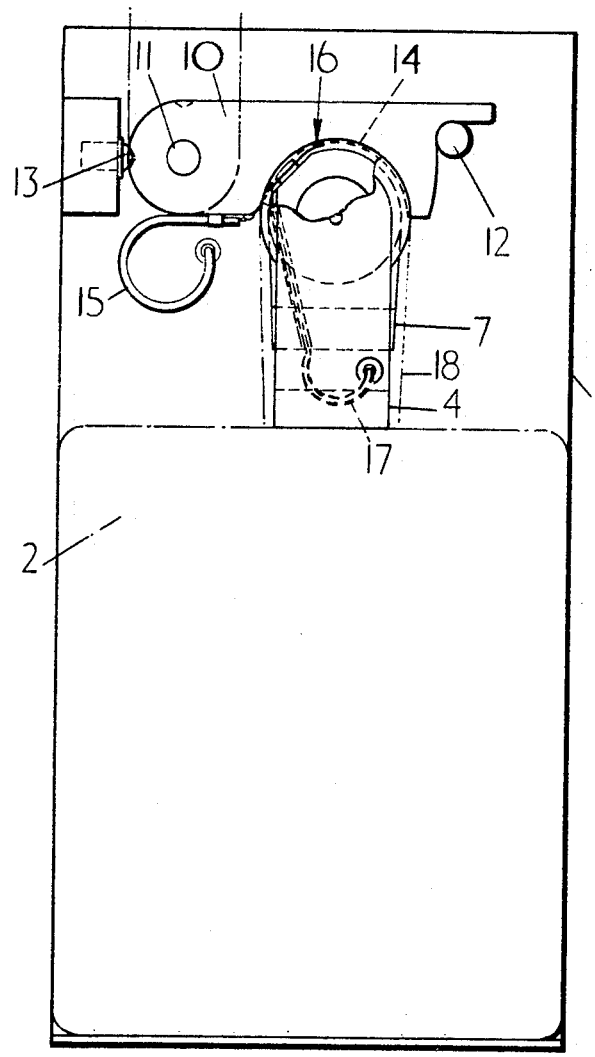
FIG. 1 is a front view of a tape timer according to the invention.
Figure 2:
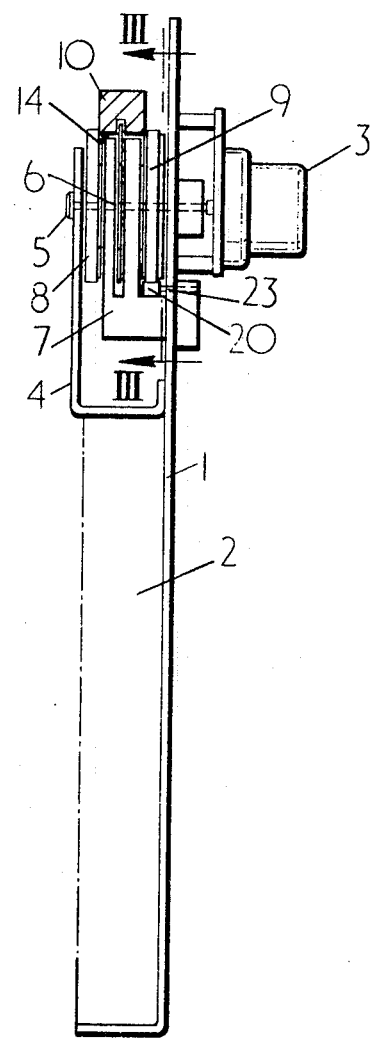
FIG. 2 is a partly sectional side view of the tape timer of FIG. 1.

Referring to FIGS. 1 and 2, a tape timer is illustrated which comprises a chassis 1 supporting a tape cartridge 2, a synchronous motor 3 and a support member 4 in which the drive shaft 5 of the motor is journalled.

A sprocket 6 is keyed to the shaft 5 between two limbs of a sensing head assembly 7, the assembly 7 being freely rotatable relative to the sprocket assembly 6, 8 and 9 which is fixed to the shaft 5.

The contact 10 is pivotal about a pin 11 so as to permit access to the assembly 7, but is normally held in the position shown against a stop 12 by a spring-loaded ball 13 engaging a cavity therein. An arcuate conductive surface 14 of the contact 10 is electrically connected to a wire 15, and a sensing contact 16 supported resiliently on the assembly 7 is electrically connected to a wire 17.

The contact 16 is arranged to bear against the arcuate conductive surface 14 of the contact 10. In use, an apertured tape is passed between the contact 16 and the surface 14, the path of the tape being bounded by the arcuate surface 14 and shown by line 18. The tape is driven at a constant speed by the sprocket 6 powered by the motor 3.

Figure 3:
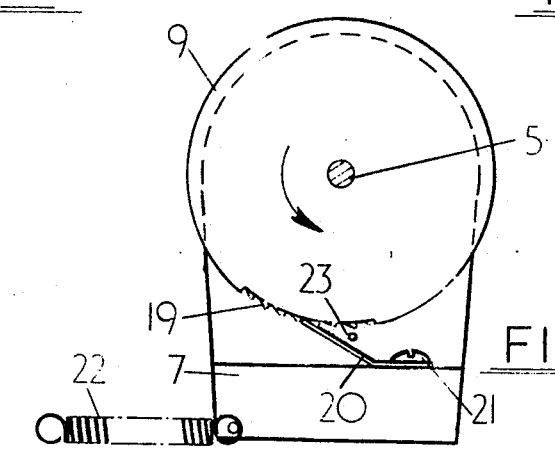
FIG. 3 is a view taken on the line III—III of FIG. 2 illustrating a detail of the tape timer.

As shown in FIG. 3, the member 9 has a notched edge 19 with which a leaf spring 20 secured to the member 7 by a screw 21 engages. A coil spring 22 anchored to the chassis 1 biases the member 7 to the initial position shown in the Figures.

In use, the motor drives the shaft 5 and hence the sprocket 6 and the member 9 in the direction of the arrow in FIG. 3. The leaf spring 20 is engaged with the member 9 and hence the member 7 is caused to rotate about the shaft 5 against the action of the spring 22.

A peg 23 is secured to the chassis 1 so that it contacts the spring 20 when the member 7 has rotated through a predetermined angle. The peg 23 then pushes the spring 20 out of the notch in the member 9 with which the spring is engaged, and the member 7 snaps back to its initial position under the action of spring 22. The spring 20 then engages with the next notch in the edge 19 of the member 9, and a further cycle begins.

The spacing of the notches is such that the contact 16 moves relative to a tape being read by one inter-aperture space in the tape each time the peg 23 releases the spring 20. Thus, when surface 4 and contact 16 touch through a hole in the tape, the contact between them is maintained until the peg 23 disengages the spring 20 and the contact 16 snaps back to the next possible aperture location.

Although in the illustrated embodiment only one contact 16 is shown, a plurality of such contacts could be provided, for example five for telex applications or eight for computer applications.

The invention lends itself to the production of a relatively cheap mechanical programmable time switch with an unlimited timing cycle and a minimum timing interval of a few seconds. Many of the parts may be for example injection moulded in a thermoplastic material.

Although in the illustrated embodiment contacts are provided for detecting the presence of an aperture in a tape, as an alternative a radiation source and a radiation detector could be arranged on opposite sides of the tape. For example, a point source of radiation could be arranged on the movable support opposite a radiation detector having a relatively large active surface area. The positions of the source and detector could of course be reversed.

What is claimed is:

1. A tape reader for reading perforated tapes comprising rotatable drive means peripherally engageable in use with an apertured tape to drive the tape along an arcuate path, first means located on one side of the path, second means mounted on a rotatable support on the other side of the path to co-operate with the first means to detect the presence between it and the first means of an aperture in the tape, means for engaging the support with the drive means so that they rotate together, means for disengaging the support from the drive means after a predetermined rotation of the support from a starting position, and means for returning the support to the starting position after its disengagement from the drive means.

2. A tape reader according to claim 1, wherein the first and second means comprise contacts arranged to connect through an aperture in the tape.

3. A tape reader according to claim 2, wherein the one of the contacts is formed by an arcuate conductive surface which bounds the said arcuate path.

4. A tape reader according to claim 3, wherein the arcuate conductive surface is provided on a member which is pivotal so as to permit access to the arcuate path.

5. A tape reader according to claim 3, wherein the other contact is resiliently mounted so as to bear against the conductive surface except when separated therefrom by a tape.

6. A tape reader according to claim 1, wherein the first and second means comprise a radiation source and a radiation detector arranged on opposite sides of the said path.

7. A tape reader according to claim 1, wherein the driving means comprise a sprocket having teeth for engaging in apertures in a tape, the sprocket being mounted on and rotatable with a shaft.

8. A tape reader according to claim 7, wherein the rotatable support for the second means comprises an assembly freely rotatable on the shaft.

9. A tape reader according to claim 8, wherein the assembly supports a leaf spring engageable with a ratchet which rotates with the shaft, and means are provided to disengage the leaf spring from the ratchet and to return the assembly to an initial position after a predetermined angular rotation of the assembly with the shift has occurred.

10. A programmable tape timer comprising a tape reader according to claim 1 and a synchronous motor for driving the drive means, and a support arranged to receive a tape cartridge so that the perforated tape of the cartridge may be passed along the said path between the first and second contacts.

* * * * *